United States Patent
Jou et al.

(10) Patent No.: US 9,013,696 B2
(45) Date of Patent: Apr. 21, 2015

(54) LIGHT QUALITY EVALUATING DEVICE

(71) Applicant: National Tsing Hua University, Hsinchu (TW)

(72) Inventors: Jwo-Huei Jou, Hsinchu (TW); Fu-Chin Yang, Hsinchu (TW); Chun-Ju Tseng, Hsinchu (TW)

(73) Assignee: National Tsing Hua University (TW)

( * ) Notice: Subject to any disclaimer, the term of this patent is extended or adjusted under 35 U.S.C. 154(b) by 89 days.

(21) Appl. No.: 14/052,926

(22) Filed: Oct. 14, 2013

(65) Prior Publication Data
US 2015/0070701 A1  Mar. 12, 2015

(30) Foreign Application Priority Data
Sep. 6, 2013  (TW) ................ 102132191 A

(51) Int. Cl.
*G01N 21/25* (2006.01)
*G01J 3/443* (2006.01)
*G01J 3/28* (2006.01)

(52) U.S. Cl.
CPC ............ *G01J 3/443* (2013.01); *G01J 2003/283* (2013.01)

(58) Field of Classification Search
USPC .................................. 356/402–425
See application file for complete search history.

(56) References Cited

U.S. PATENT DOCUMENTS 6,366,270 B1 * 4/2002 Evanicky ............ 345/88

\* cited by examiner

*Primary Examiner* — Abdullahi Nur

(57) ABSTRACT

The present invention relates to a light quality evaluating device, comprising a light receiving unit, first processing unit, a memory unit, a second processing unit, a display unit, and a power management unit, and being used for evaluating the light quality light based on physiological perception of human. In evaluating operation, it transfers a power spectrum of the light emitted from a light source to a luminance spectrum of light through a luminosity function. Next, the method compares the luminance spectrum of light with a corresponding luminance spectrum of blackbody radiation thereof. Therefore, an index of spectral resemblance with respect to the black body radiation ($SR_{BR}$) would be calculated and then obtained, such that the $SR_{BR}$ can be used for evaluating the quality of the light emitted from the light source. Moreover, comparing to conventional CRI, $SR_{BR}$ is a better light quality evaluating method because of having fairness and consistency.

20 Claims, 13 Drawing Sheets

1

|  | incandescent lamp | high pressure sodium lamp | fluorescent lamp | LED device |
|---|---|---|---|---|
| $SR_{BR}$ | 97 | 22 | 98 | 97 |
| CRI | 100 | 61 | 78 | 94 |

FIG. 11

LIGHT QUALITY EVALUATING DEVICE

BACKGROUND OF THE INVENTION

1. Field of the Invention

The present invention relates to a method for analyzing and evaluating the quality of a light source, and more particularly to a light source quality evaluating method by using spectral resemblance with respect to the blackbody radiation.

2. Description of the Prior Art

Light is an important find and use in human civilization society; therefore, according to natural light emitted by sun, the ancient people are able to rise with the sunrise and take rest with the sunset. With the advancement of the technologies, the artificial light is developed from bulb to incandescent bulb after the Edison invents the bulb. Moreover, the solid-state lighting (SSL), such as light-emitting diode (LED), organic light-emitting diode (OLED) and polymer light-emitting diode (PLED), the latest lighting technology is further be proposed.

ELI (ergonomic lighting indicator) is a comprehensive evaluating standard for lighting quality. Please refer to FIG. 1, there is shown a degree indicator diagram of the ELI. As shown in FIG. 1, ELI includes 5 indicating indices for evaluating a light source, the indicating indices consists of:

(A) visual performance, including the factors of illumination, color rendering, and contrast;
(B) vista, including the factors of user psychology, visual hierarchy, and building materials;
(C) visual comfort, including the factors of light distribution uniformity, the existence of uncomfortable glare, and light flashes;
(D) vitality, including the factors of impacts on people's psychological and stimulation; and
(E) empowerment, including the factors of individual light modulation, selective lighting scenes and layouts.

Therefore, through above descriptions, it is able to know there have 4 indicating indices of the ELI being correspondent with the physiological perception of human, which are visual performance, vista, vitality, and empowerment. Accordingly, it is able to further understand that the human's physiological perception is very important for the ELI.

However, differing from the ELI, CRI (color rendering index) is used for evaluating the light quality by distinct way. The method for measuring the CRI of a light source includes the steps of: Firstly, making a light source to illuminate an object for facilitating the object reveals its object color; next, making a reference light source to illuminate the object for facilitating the object reveals a reference object color. Eventually, quantitatively comparing the object color with the reference object color according to 8 color samples of DIN 6169, therefore the CRI of the light source can be obtained.

Through the method steps for measuring the CRI of the light source, it is able to know that the primary step is comparing the object color with the reference object color according to 8 color samples of DIN 6169; obviously, the CRI—measuring steps does not concern or refer human's physiological perception. Based on this reason, predictably, the light source having high CRI value may not show good ELI values on visual performance, vista, vitality, and empowerment. It means that CRI may not be the best index for light source quality because of lacking fairness and consistency.

Accordingly, in view of the CRI may not be the best index for light source quality, the inventor of the present application has made great efforts to make inventive research thereon and eventually provided a light quality evaluating device by using spectral resemblance with respect to the blackbody radiation.

SUMMARY OF THE INVENTION

The primary objective of the present invention is to provide a light quality evaluating device, which can be used for evaluating the light quality of based on physiological perception of human. In evaluating operation, the device firstly transfers a power spectrum of a light source to a luminance spectrum of light source through a luminosity function, and next compares the luminance spectrum of the light source with a luminance spectrum of the blackbody radiation thereof. Therefore, an index of spectral resemblance with respect to the black body radiation ($SR_{BR}$) would be calculated and then obtained, such that the SRBR can be used for evaluating the quality of the light source. Moreover, comparing to conventional color rendering index (CRI), $SR_{BR}$ is a better light source quality evaluating method because of having fairness and consistency.

Accordingly, to achieve the primary objective of the present invention, the inventor of the present invention provides a light quality evaluating device, comprising:

a light receiving unit, used for receiving a light signal emitted from an external light source;

a first process unit, coupled to the light receiving unit, wherein the first process unit has a black body radiation spectrum transforming module for processing the light signal to a spectrum data, so as to transform a color temperature data obtained from the spectrum data into a black body radiation spectrum;

a memory unit, coupled to the first process unit for storing the spectrum data, the color temperature data and the black body radiation spectrum;

a second process unit, coupled to the first process unit and having a luminance spectrum transforming module and a spectrum comparing module, wherein after the second process unit accesses the spectrum data from the memory unit, the luminance spectrum transforming module would transform the spectrum data into a luminance spectrum; therefore the spectrum comparing module is able to calculate an index of spectral resemblance with respect to the black body radiation (SRBR) after comparing the luminance spectrum with the black body radiation spectrum;

a display unit, coupled to the second unit for displaying the index of spectral resemblance with respect to the black body radiation (SRBR); and a power management unit, coupled to the light receiving unit, the first process unit, the second process unit, and the display unit for supplying electricity energy to the light receiving unit, the first process unit, the second process unit, and the display unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 11 is a statistical table of the $SR_{BR}$ of the incandescent lamp, the HPS lamp, the fluorescent tube, and the LED device.

DETAILED DESCRIPTION OF THE PREFERRED EMBODIMENTS

To more clearly describe a light quality evaluating device according to the present invention, embodiments of the present invention will be described in detail with reference to the attached drawings hereinafter.

Figure 1:
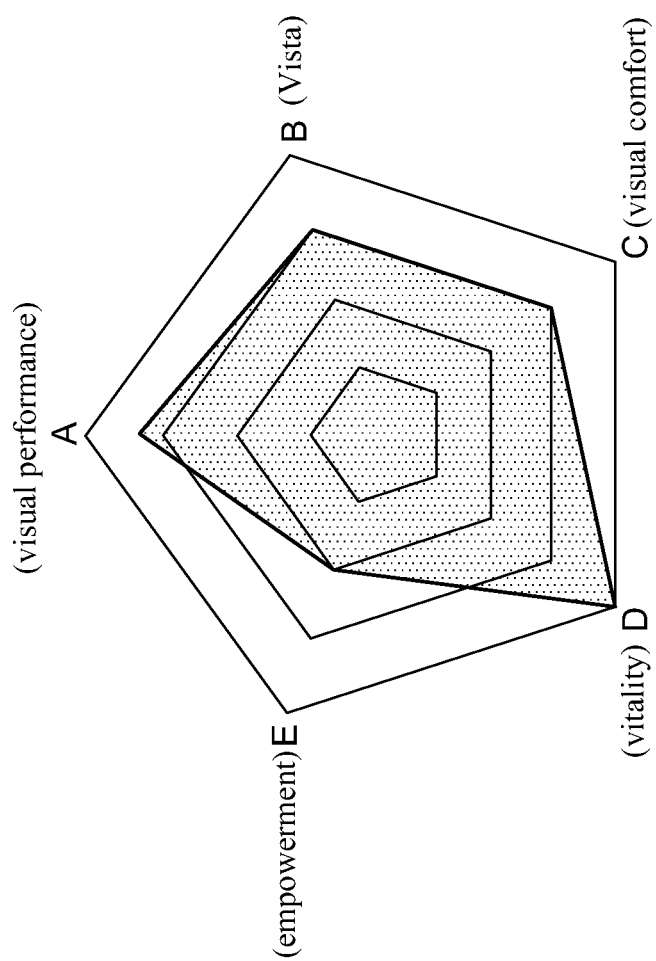
FIG. 1 is a degree indicator diagram of the ELI.
Figure 2:
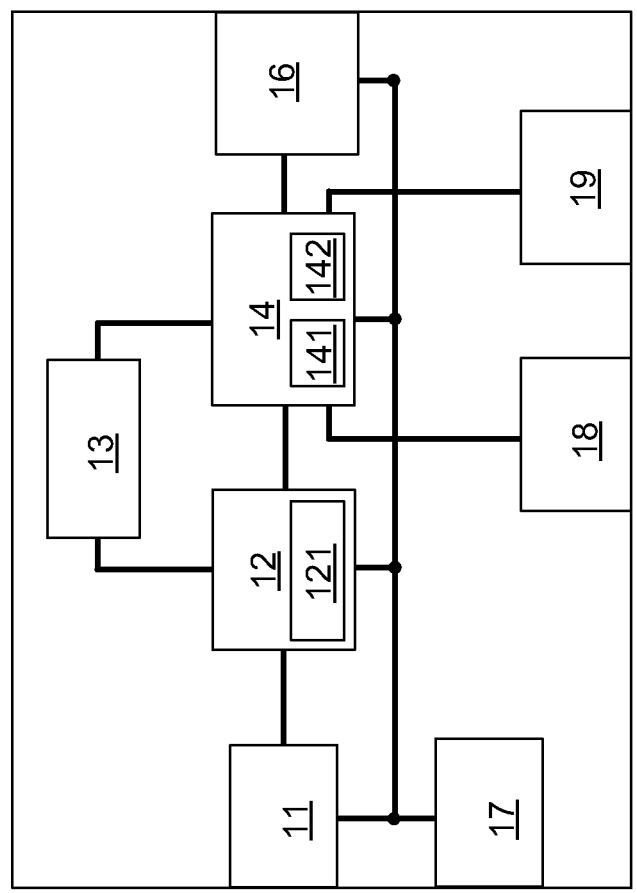
FIG. 2 is a block diagram of the light quality evaluating device according to the present invention.
Figure 3:
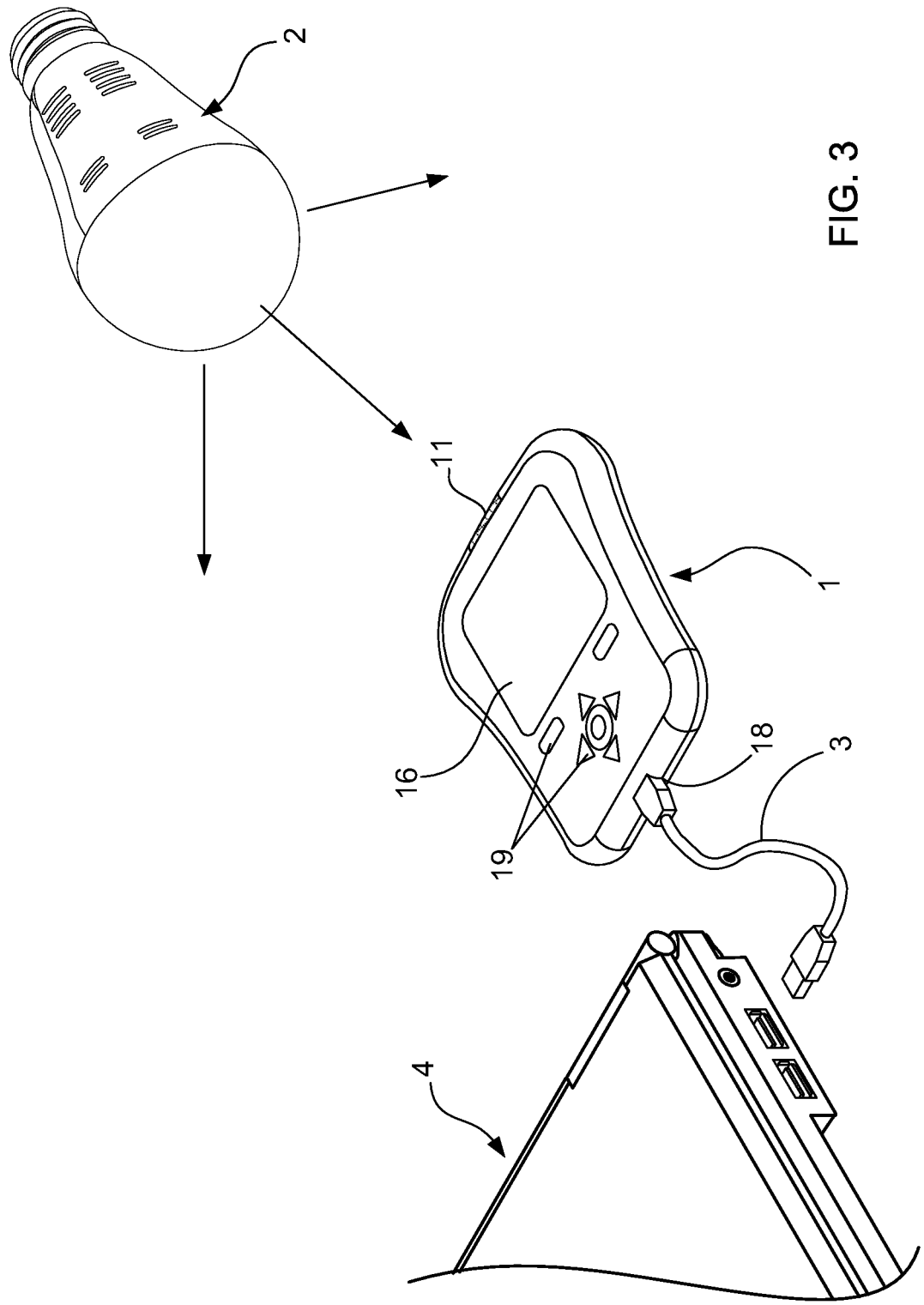
FIG. 3 is a schematic stereo view of the light quality evaluating device.

The light quality evaluating device of the present invention is used for analyzing and evaluating the quality of lights emitted by various lighting devices, such as incandescent lamp, high pressure sodium (HPS) lamp, fluorescent lamp, light-emitting diode (LED) device, organic light-emitting diode (OLED) device, polymer light-emitting diode (PLED) lamp, and candle. Please refer to FIG. 2, which illustrates a block diagram of the light quality evaluating device; moreover, FIG. 3 shows a schematic stereo view of the light quality evaluating device. As shown in FIG. 2 and FIG. 3, the light quality evaluating device 1 of the present invention consists of: a light receiving unit 11, a first process unit 12, a memory unit 13, a second process unit 14, a display unit 16, a power management unit 17, a connection unit 18, and an input unit 19.

The light receiving unit 11 is used for receiving a light signal emitted from an external light source 2. The first process unit 12 is coupled to the light receiving unit 11 and has a black body radiation spectrum transforming module 121 for processing the light signal to a spectrum data (i.e., a power spectrum), so as to further transform a color temperature data obtained from the spectrum data into a black body radiation spectrum.

Herein, it needs to further explain that, the black body radiation spectrum transforming module 121 transforms the color temperature data obtained from the spectrum data into the black body radiation spectrum by using a Planck's law of $I_{BR}(\lambda, T)=(2hc^2/\lambda^5)/[1/(e^{(hc/\lambda kT)}-1)]$, wherein the "h" in the Planck's law represents the Planck constant, and the "c", the "k" and the "T" respectively represent the light velocity, the Boltzmann constant and the temperature.

The memory unit 13 is coupled to the first process unit 12 for storing the spectrum data, the color temperature data and the black body radiation spectrum. The second process unit 14 is coupled to the first process unit 12 and has a luminance spectrum transforming module 141 and a spectrum comparing module 142, wherein after the second process unit 14 accesses the spectrum data from the memory unit 13, the luminance spectrum transforming module 141 would transform the spectrum data into a luminance spectrum of light; therefore, the spectrum comparing module 142 is able to calculate an index of spectral resemblance with respect to the black body radiation ($SR_{BR}$) after comparing the luminance spectrum of light with the corresponding luminance spectrum of blackbody radiation thereof.

Particularly, in this light quality evaluating device 1, the luminance spectrum transforming module 141 transforms the spectrum data into the luminance spectrum through multiplying the spectrum data by the luminosity function. Moreover, by using a spectrum comparing function set, the spectrum comparing module 142 is able to firstly overlap the luminance spectrum of light with the corresponding luminance spectrum of blackbody radiation, and next calculates an overlapped area between the luminance spectrum of light and the corresponding luminance spectrum of blackbody radiation thereof, so as to eventually obtain the index of spectral resemblance with respect to the blackbody-radiation ($SR_{BR}$) dividing the overlapped area by the area of the luminance spectrum of blackbody radiation. the spectrum comparing function set comprises:

$$SR_{BR}=[(\int L(\lambda,T)d\lambda)/(\int L_{BR}(\lambda,T)d\lambda)]\times 100\%; \quad (1)$$

$$L(\lambda,T)=\alpha L_1(\lambda,T), \text{ if } L_{BR}(\lambda,T)>\alpha L_1(\lambda,T); \quad (2a)$$

$$L(\lambda,T)=L_{BR}(\lambda,T), \text{ if } L_{BR}(\lambda,T)\leq \alpha L_1(\lambda,T); \text{ and} \quad (2b)$$

$$\alpha=(\int LBR(\lambda,T)d\lambda)/(\int L1(\lambda,T)d\lambda). \quad (3)$$

In above 4 formulas, $L_{BR}(\lambda, T)$ means the luminance spectrum of blackbody radiation of the light, $L(\lambda, T)$ means the overlapped area, and α means a luminance constant for equalizing the luminance of the luminance spectrum of light ($L_1(\lambda, T)$) and the luminance spectrum of blackbody radiation ($L_{BR}(\lambda, T)$).

Continuously describing the light quality evaluating device 1 of the present invention, in which the display unit 16 is coupled to the second unit 14 for displaying the index of spectral resemblance with respect to the black body radiation ($SR_{BR}$), and the power management unit 17 is coupled to the light receiving unit 11, the first process unit 12, the second process unit 14, and the display unit 16 for supplying electricity energy to the light receiving unit 11, the first process unit 12, the second process unit 14, and the display unit 16. Moreover, a connection unit 18, such as an USB connector, a MiniUSB connector or a MicroUSB connector, can be coupled to the second process unit 14 for being electrically connected with an external electronic device 4 through a cable 3, so as to transmit the spectrum data, the color temperature data, the luminance spectrum of blackbody radiation, and the index of spectral resemblance with respect to the black body radiation ($SR_{BR}$) to the electronic device 4.

Figure 4A:
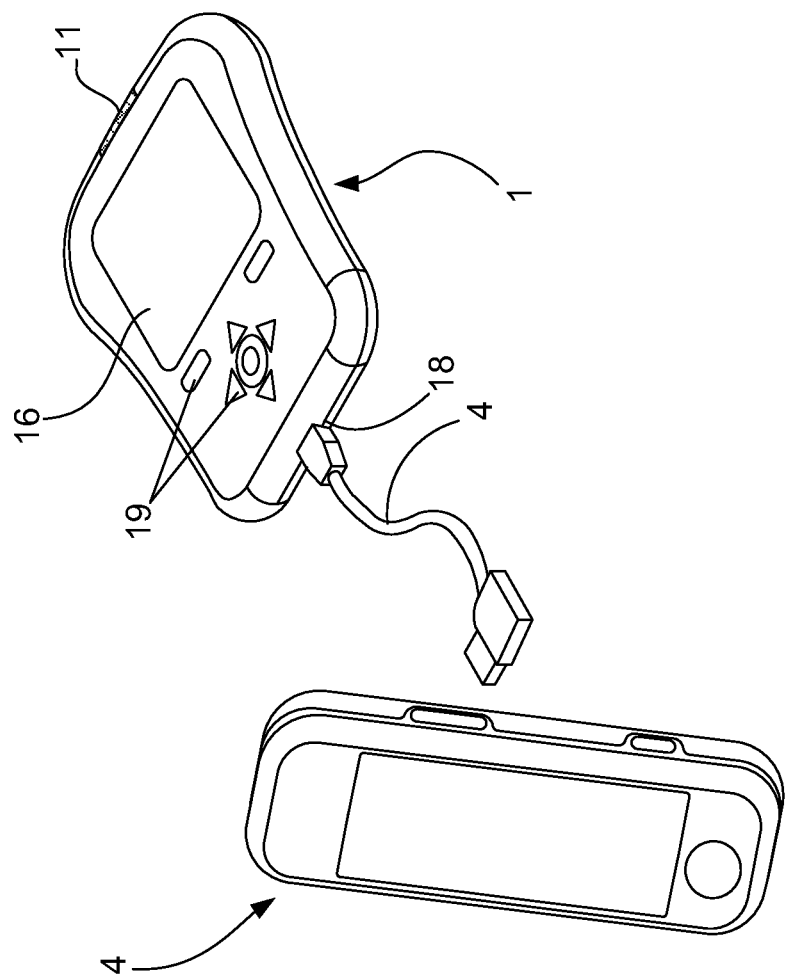
FIGS. 4A, 4B and 4C are schematic stereo views of the light quality evaluating device.
Figure 4B:
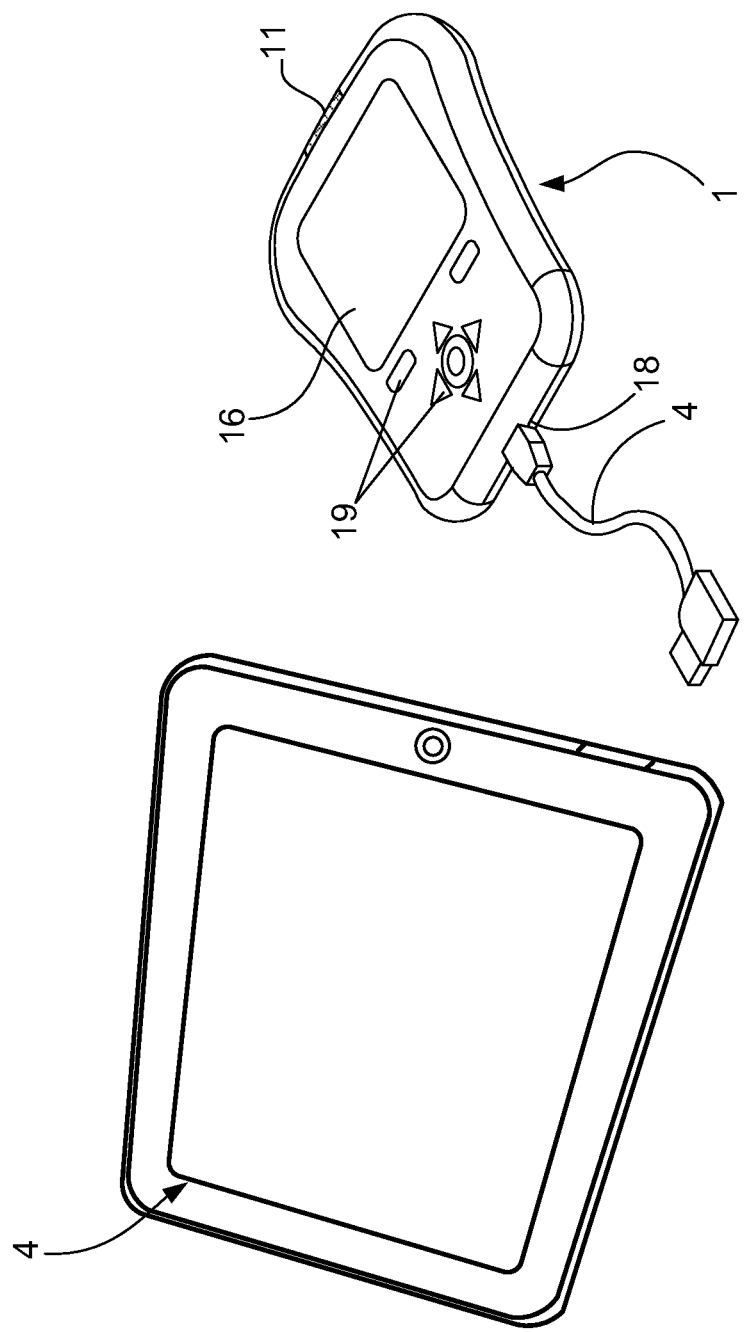
Figure 4C:
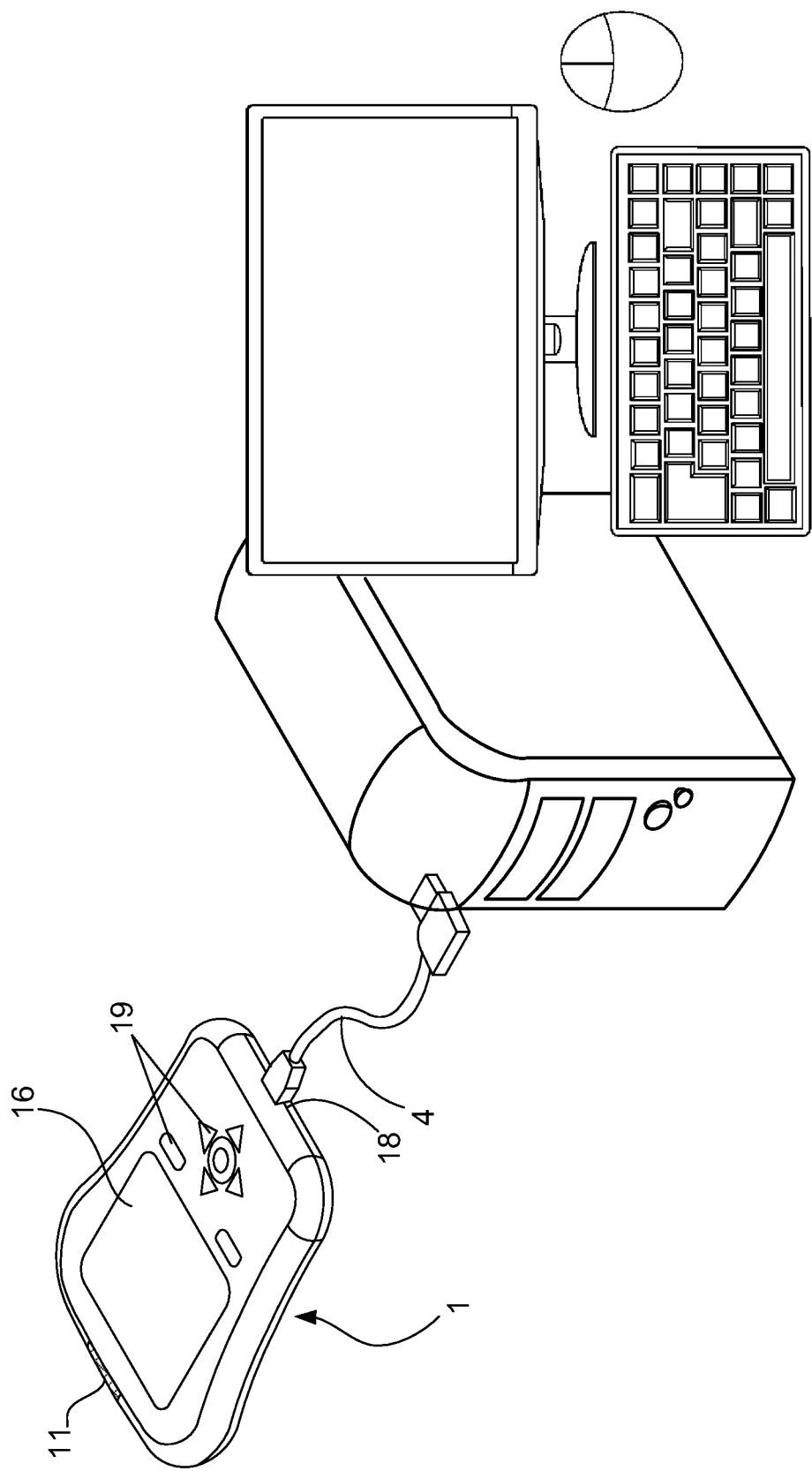

Herein, it needs to explain that, although FIG. 3 illustrates the electronic device 4 as a notebook, it does not limit the exemplary embodiment of the electronic device 4. When applying and operating the light quality evaluating device 1, as shown in FIG. 4A, FIG. 4B, and FIG. 4C, the electronic device 4 cam also be a smart phone, a tablet PC or a computer. Besides, an input unit 19, such as a keystroke set, can also be coupled to the second process unit 14, so as to provide a user to input the basic information of the light source into the light quality evaluating device 1.

Figure 5:
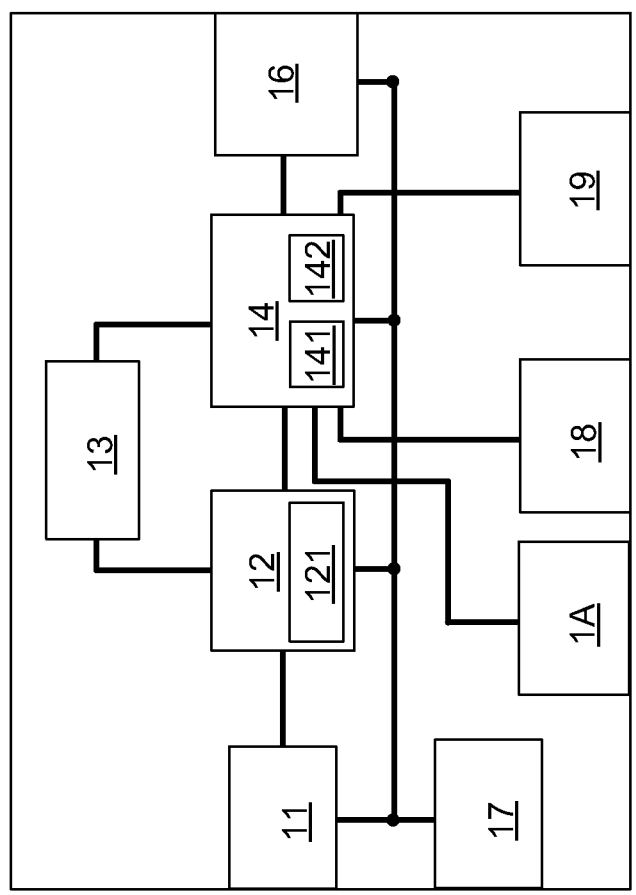
FIG. 5 is a block diagram of a second embodiment of the light quality evaluating device according to the present invention.
Figure 6:
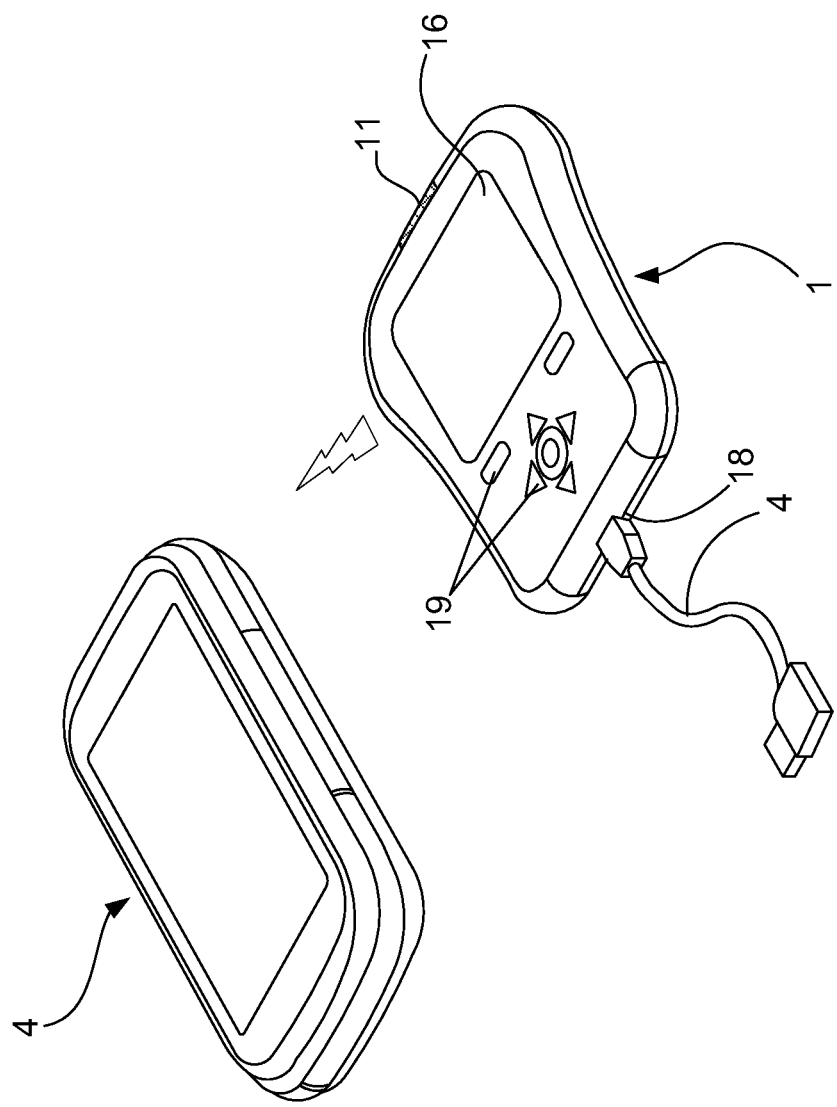
FIG. 6 is a schematic stereo view of the second embodiment of the light quality evaluating device.

Moreover, the present invention further proposes a second embodiment of the light quality evaluating device. Please refer to FIG. 5 and FIG. 6, which respectively illustrate a block diagram and a schematic stereo view of the second embodiment light quality evaluating device. As shown in FIG. 5 and FIG. 6, the second embodiment light quality evaluating device 1 consists of: a light receiving unit 11, a first process unit 12, a memory unit 13, a second process unit 14, a display unit 16, a power management unit 17, a connection unit 18, an input unit 19, and a wireless transmission module 1A, wherein the wireless transition module 1A is coupled to the second process unit 14. In the present invention, the wireless transmission unit 1A can be a wifi transmission module, a RFID transmission module, a Bluetooth transmission module, or a zigbee transmission module. So that, the second process unit 14 can transmit the spectrum data, the color temperature data, the luminance spectrum of blackbody radiation, and the index of spectral resemblance with respect to the black body radiation ($SR_{BR}$) to the electronic device 4 through the wireless transmission module 1A.

Figure 7:
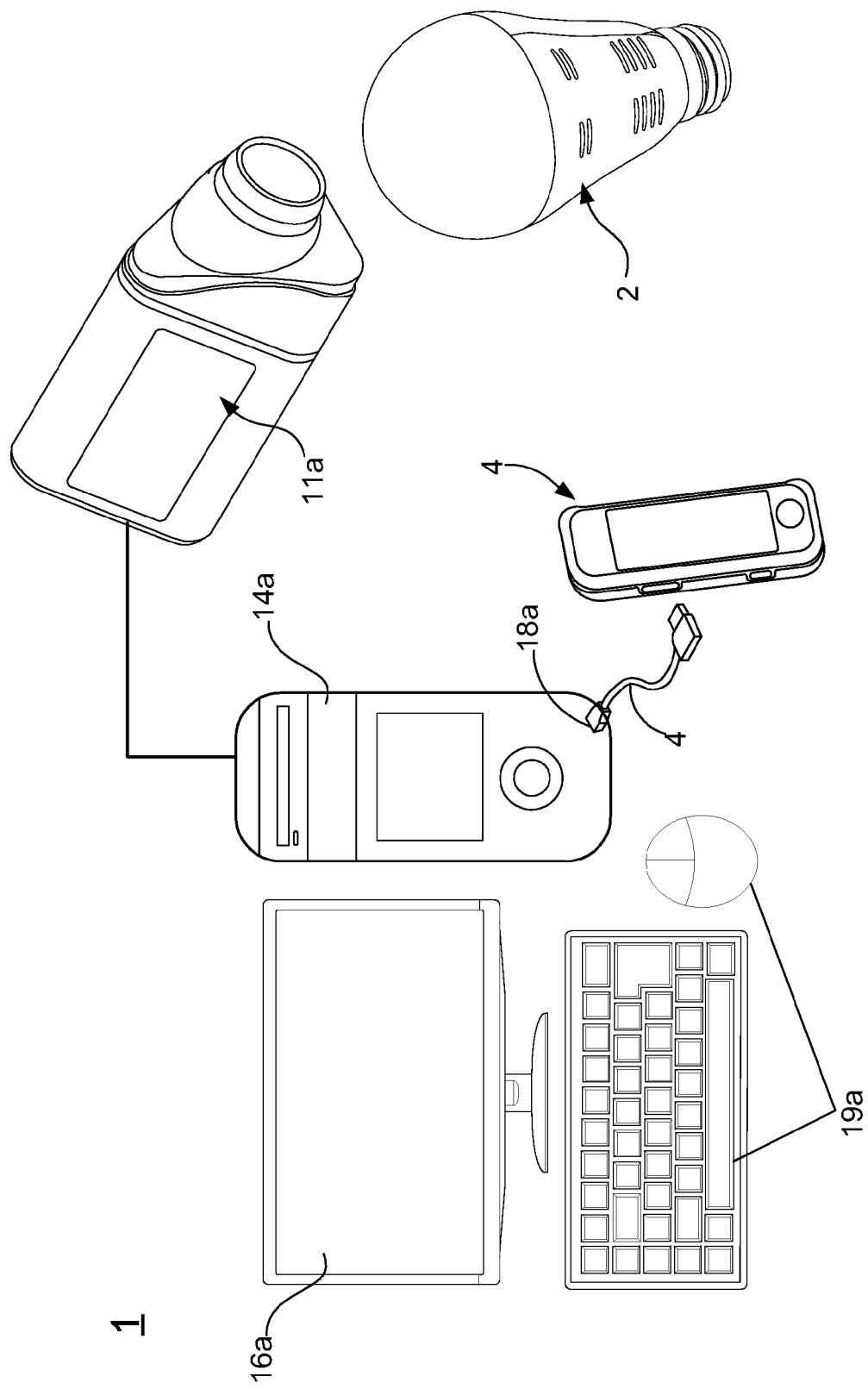
FIG. 7 is a framework diagram of the third embodiment of the light quality evaluating device.

Moreover, the present invention also proposes a third embodiment of the light quality evaluating device. Please refer to FIG. 7, there is shown a framework diagram of the third embodiment of the light quality evaluating device. As shown in FIG. 7, the third embodiment of the light quality evaluating device 1 consists of: a process device 14a, a display device 16a and a light receiving device 11a, wherein the light receiving device 11a is a spectrum analyzer, and the process device 14a is a computer with a built-in black body radiation spectrum transforming module for processing the light signal to a spectrum data (i.e., a power spectrum), so as to further transform a color temperature data obtained from the spectrum data into a luminance spectrum of blackbody radiation. In addition, the process device 14a also includes a luminance spectrum transforming module and a spectrum comparing module, wherein after the process device 14a accesses the spectrum data from the memory, the luminance spectrum transforming module would transform the spectrum data into a luminance spectrum of light; therefore, the spectrum comparing module is able to calculate an index of spectral resemblance with respect to the black body radiation (SRBR) after comparing the luminance spectrum of light with the corresponding luminance spectrum of blackbody radiation thereof.

For the third embodiment of the light quality evaluating device 1, the black body radiation spectrum transforming module, the luminance spectrum transforming module and the spectrum comparing module can be implemented to an engineering statistical software, for example, Excel® software. Of course, the engineering statistical software does not limit to be Excel® software, it can also be the software or program of C, C++, MATLAB, Fortran, or Visual Basic.

Figure 8:
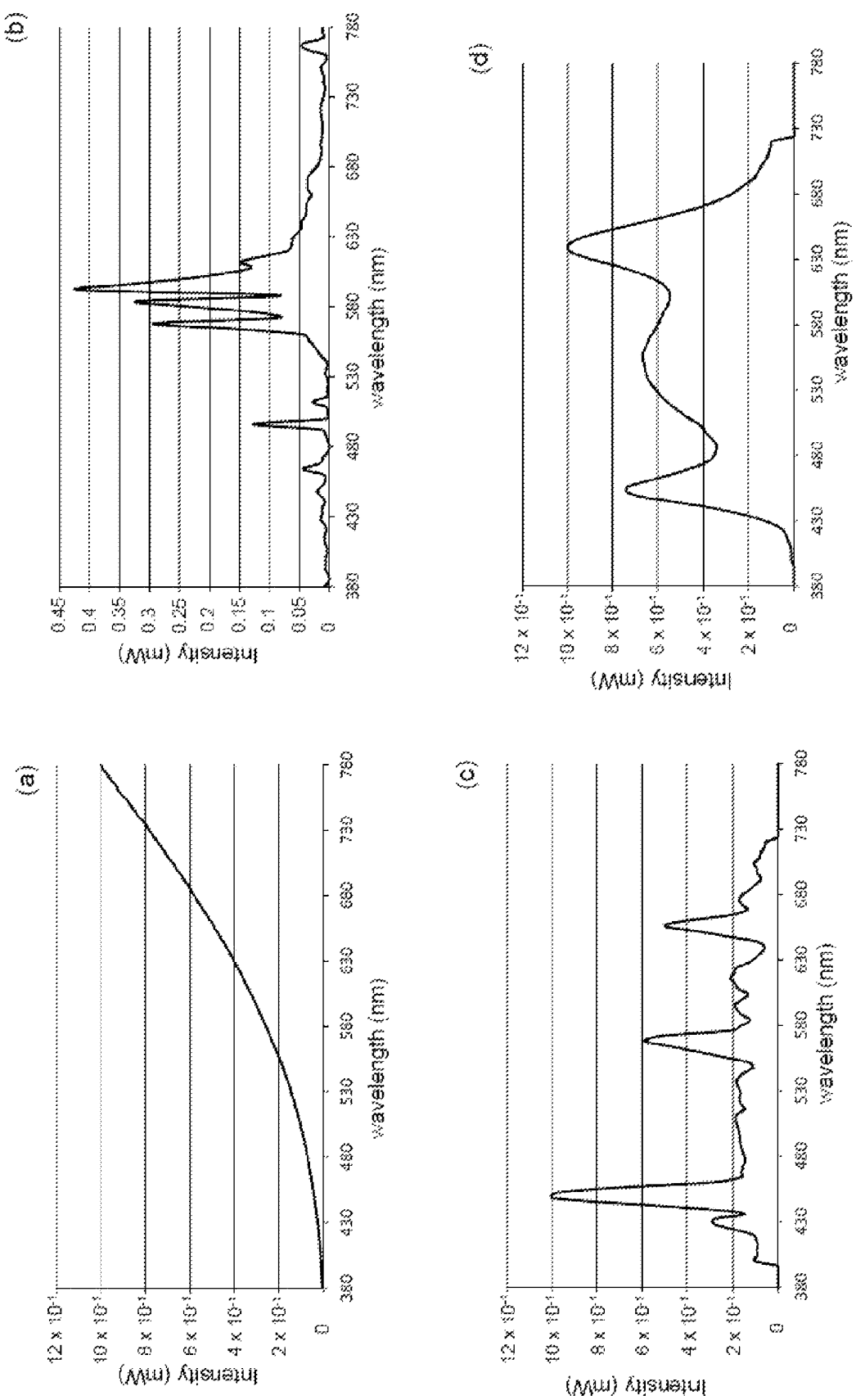
FIG. 8 is a power spectrum plot of different light sources.
Figure 9:
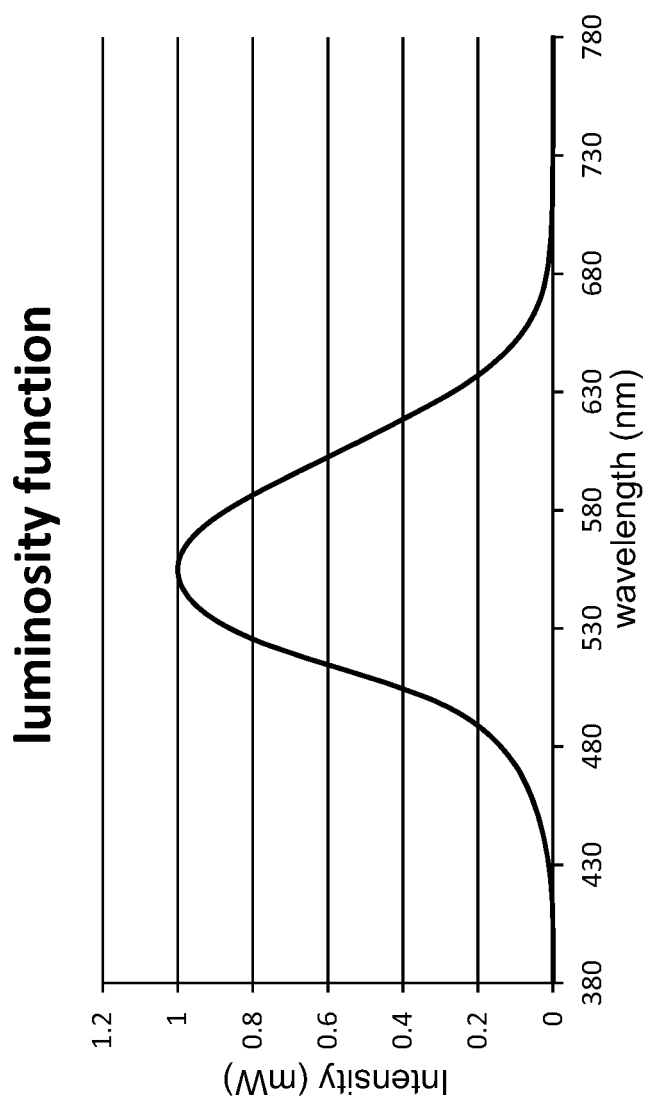
FIG. 9 is a diagram of a luminosity function.

Next, in order to prove the practicability of the light source quality evaluating method by using spectral resemblance with respect to the blackbody radiation, various experiment data will be presented in following paragraphs. Please refer to FIG. 8, there is shown 4 power spectrums of different light sources. In FIG. 8, plots (a), (b), (c), and (d) are power spectrums of an incandescent lamp, a high pressure sodium (HPS) lamp, a fluorescent tube, and a light-emitting diode (LED) device, respectively. Moreover, referring to FIG. 9, which illustrates a diagram of a luminosity function. As shown in FIG. 9, the luminosity function consists of a plurality of visual-sensitivity lights, and the range of the visual-sensitivity wavelengths of the visual-sensitivity lights covers the wavelengths of the incandescent lamp, the HPS lamp, the fluorescent tube, and the LED device.

Figure 10:
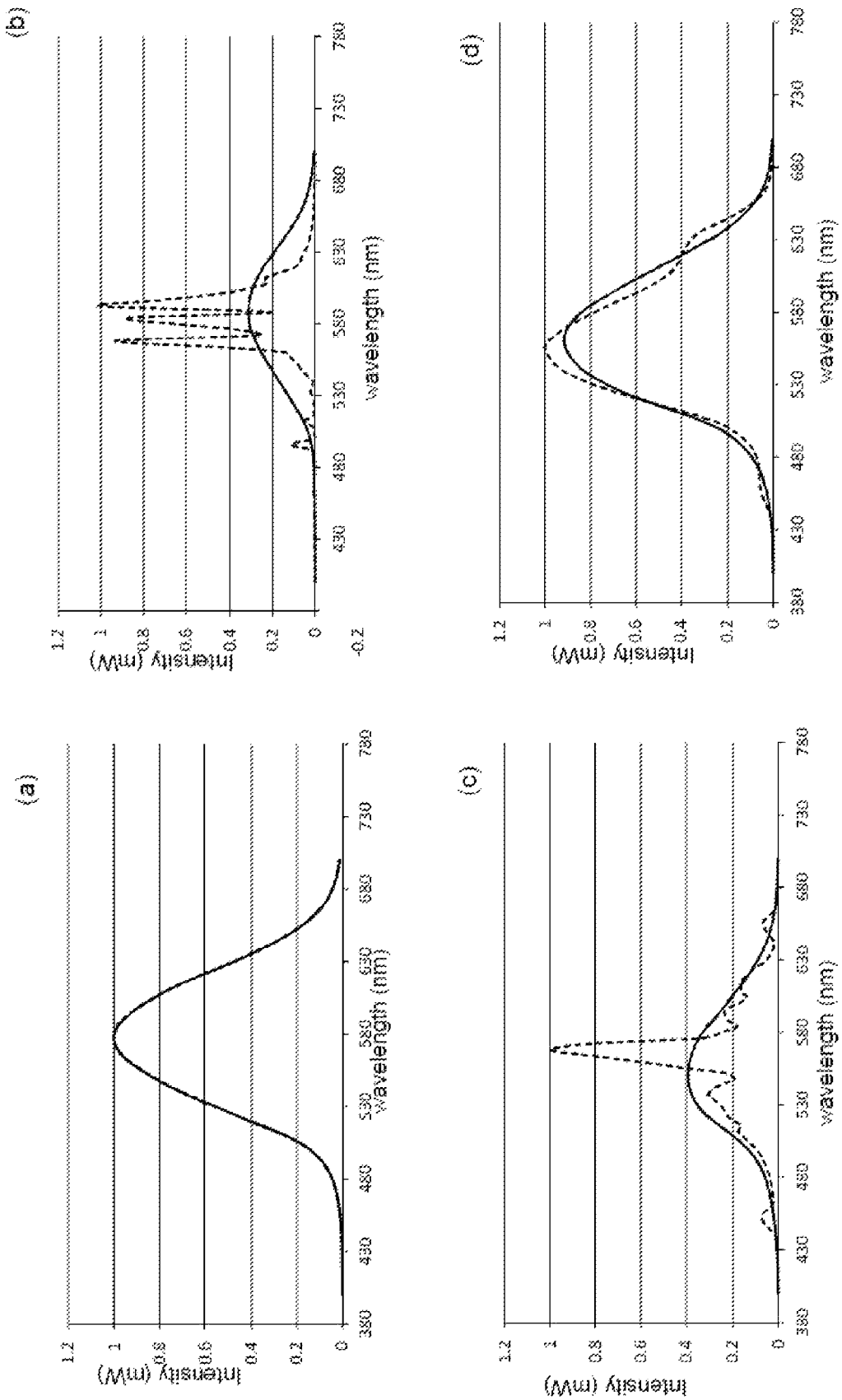
FIG. 10 is schematic comparison diagrams of luminance spectrum of incandescent bulb, HPS lamp, fluorescent tube, and LED device and the corresponding luminance spectrum of blackbody radiation thereof.

Eventually, please refer to FIG. 10, there are shown schematic comparison diagrams of luminance spectrum of incandescent lamp, HPS lamp, fluorescent tube, and LED device and the corresponding luminance spectrum of blackbody radiation thereof As shown in plot (a) of FIG. 10, an index of spectral resemblance with respect to the blackbody-radiation ($SR_{BR}$) of the incandescent lamp is calculated by way of calculating an overlapped area between the luminance spectrum of incandescent lamp and the corresponding luminance spectrum of blackbody radiation thereof, and dividing the overlapped area by the area of the luminance spectrum of blackbody radiation. Similarly, as shown in plots (b)-(c), the $SR_{BR}$ of the HPS lamp, the fluorescent tube, and the LED device are also calculated.

Furthermore, please refer to FIG. 11, which illustrates a statistical table of the $SR_{BR}$ of the incandescent lamp, the HPS lamp, the fluorescent tube, and the LED device. As shown in FIG. 11, the CRI of the incandescent lamp, the HPS lamp, the fluorescent tube, and the LED device are respectively 100, 61, 78, and 94; however, the $SR_{BR}$ of the incandescent lamp, the HPS lamp, the fluorescent tube, and the LED device are respectively 97, 22, 98, and 97. Therefore, form the statistical table, it can find that the incandescent lamp's CRI is very close to its $SR_{BR}$; however, there has a large difference between the HPS lamp's CRI and $SR_{BR}$.

Thus, through the descriptions, light quality evaluating device 1 of the present invention has been completely introduced and disclosed; Moreover, the practicability and the technology feature have also been proven by various experiment data. So that, in summary, the present invention has the following advantages:

The light quality evaluating device 1 of the present invention can be used for evaluating the light quality of based on physiological perception of human. In evaluating operation, the device firstly transfers a power spectrum of a light source to a luminance spectrum of light source through a luminosity function, and next compares the luminance spectrum of light source with corresponding luminance spectrum of blackbody radiation thereof. Therefore, an index of spectral resemblance with respect to the black body radiation ($SR_{BR}$) would be calculated and then obtained, such that the $SR_{BR}$ can be used for evaluating the quality of the light source. Moreover, comparing to conventional color rendering index (CRI), $SR_{BR}$ is a better light source quality evaluating method because of having fairness and consistency.

The above description is made on embodiments of the present invention. However, the embodiments are not intended to limit scope of the present invention, and all equivalent implementations or alterations within the spirit of the present invention still fall within the scope of the present invention.

What is claimed is:
1. A light quality evaluating device, comprising:
a light receiving unit, being used for receiving a light signal emitted from an external light source;
a first process unit, being coupled to the light receiving unit, wherein the first process unit has a black body radiation spectrum transforming module for processing the light signal to a spectrum data, so as to transform a color temperature data obtained from the spectrum data into a luminance spectrum of blackbody radiation;
a memory unit, being coupled to the first process unit for storing the spectrum data, the color temperature data and the luminance spectrum of blackbody radiation;
a second process unit, being coupled to the first process unit and having a luminance spectrum transforming module and a spectrum comparing module, wherein after the second process unit accesses the spectrum data from the memory unit, the luminance spectrum transforming module would transform the spectrum data into a luminance spectrum of light; therefore, the spectrum comparing module is able to calculate an index of spectral resemblance with respect to the black body radiation ($SR_{BR}$) after comparing the luminance spectrum of light with the corresponding luminance spectrum of blackbody radiation thereof;

a display unit, being coupled to the second unit for displaying the index of spectral resemblance with respect to the black body radiation ($SR_{BR}$); and a power management unit, being coupled to the light receiving unit, the first process unit, the second process unit, and the display unit for supplying electricity energy to the light receiving unit, the first process unit, the second process unit, and the display unit.

2. The light quality evaluating device of claim 1, further comprising:

a connection unit, being coupled to the second process unit and used for being electrically connected with an external electronic device, so as to transmit the spectrum data, the color temperature data, the black body radiation spectrum, and the index of spectral resemblance with respect to the black body radiation ($SR_{BR}$) to the electronic device; and an input unit, being coupled to the second process unit, wherein the basic information of the light source can be inputted in to the light quality evaluating device by using the input unit.

3. The light quality evaluating device of claim 2, wherein the input unit is a keystroke set.

4. The light quality evaluating device of claim 2, wherein the connection unit is selected from the group consisting of: USB connector, MiniUSB connector and MicroUSB connector.

5. The light quality evaluating device of claim 2, wherein the electronic device is selected from the group consisting of: smart phone, tablet PC, computer, and notebook.

6. The light quality evaluating device of claim 1, wherein the power management unit is selected from the group consisting of: battery and power supply.

7. The light quality evaluating device of claim 1, wherein the black body radiation spectrum transforming module transforms the color temperature data obtained from the spectrum data into the luminance spectrum of blackbody radiation by using a Planck's law of $I_{BR}(\lambda, T)=(2hc^2/\lambda^5)/[1/(e^{(hc/\lambda kT)}-1)]$, wherein the "h" in the Planck's law represents the Planck constant, and the "c", the "k" and the "T" respectively represent the speed of light, the Boltzmann constant and the temperature.

8. The light quality evaluating device of claim 1, wherein the luminance spectrum transforming module transforms the spectrum data into the luminance spectrum of light through multiplying the spectrum data by the luminosity function.

9. The light quality evaluating device of claim 1, wherein by using a spectrum comparing function set, the spectrum comparing module is able to firstly overlap the luminance spectrum of light with the luminance spectrum of blackbody radiation, and next calculates an overlapped area between the luminance spectrum of light and the luminance spectrum of blackbody radiation, so as to eventually obtain the index of spectral resemblance with respect to the blackbody-radiation ($SR_{BR}$) dividing the overlapped area by the area of the luminance spectrum of blackbody radiation.

10. The light quality evaluating device of claim 9, wherein the spectrum comparing function set comprises: (1) $SR_{BR}=[(\int L(\lambda, T)d\lambda)/(\int L_{BR}(\lambda, T)d\lambda)]\times 100\%$; (2a) $L(\lambda, T)=\alpha L_1(\lambda, T)$, if $L_{BR}(\lambda, T) > \alpha L_1(\lambda, T)$; (2b) $L(\lambda, T)=L_{BR}(\lambda, T)$, if $L_{BR}(\lambda, T) \leq \alpha L_1(\lambda, T)$; and (3) $\alpha=(\int LBR(\lambda, T)d\lambda)/(\int L1(\lambda, T)d\lambda)$; wherein $L_{BR}(\lambda, T)$ means the luminance spectrum of blackbody radiation of the light signal, $L(\lambda, T)$ means the overlapped area, $\alpha$ means a luminance constant for equalizing the luminance of the luminance spectrum of light ($L_1(\lambda, T)$) and the luminance spectrum of blackbody radiation ($L_{BR}(\lambda, T)$).

11. The light quality evaluating device of claim 1, wherein the spectrum data of the light signal is a power spectrum.

12. A light quality evaluating device, comprising:

a light receiving unit, being used for receiving a light signal emitted from an external light source;

a first process unit, being coupled to the light receiving unit, wherein the first process unit has a black body radiation spectrum transforming module for processing the light signal to a spectrum data, so as to transform a color temperature data obtained from the spectrum data into a luminance spectrum of blackbody radiation;

a memory unit, being coupled to the first process unit for storing the spectrum data, the color temperature data and the luminance spectrum of blackbody radiation;

a second process unit, being coupled to the first process unit and having a luminance spectrum transforming module and a spectrum comparing module, wherein after the second process unit accesses the spectrum data from the memory unit, the luminance spectrum transforming module would transform the spectrum data into a luminance spectrum of light; therefore, the spectrum comparing module is able to calculate an index of spectral resemblance with respect to the black body radiation ($SR_{BR}$) after comparing the luminance spectrum of light with the corresponding luminance spectrum of blackbody radiation thereof;

a display unit, being coupled to the second unit for displaying the index of spectral resemblance with respect to the black body radiation ($SR_{BR}$);

a wireless transmission module, being coupled to the second process unit, and used for transmits the spectrum data, the color temperature data, the luminance spectrum of blackbody radiation, and the index of spectral resemblance with respect to the black body radiation ($SR_{BR}$) to an external electronic device; and a power management unit, being coupled to the light receiving unit, the first process unit, the second process unit, and the display unit for supplying electricity energy to the light receiving unit, the first process unit, the second process unit, and the display unit.

13. The light quality evaluating device of claim 12, further comprising:

a connection unit, being coupled to the second process unit and used for being electrically connected with an external electronic device, so as to transmit the spectrum data, the color temperature data, the black body radiation spectrum, and the index of spectral resemblance with respect to the black body radiation ($SR_{BR}$) to the electronic device; and an input unit, being coupled to the second process unit, wherein the basic information of the light source can be inputted in to the light quality evaluating device by using the input unit.

14. The light quality evaluating device of claim 13, wherein the connection unit is selected from the group consisting of: USB connector, MiniUSB connector and MicroUSB connector.

15. The light quality evaluating device of claim 13, wherein the wireless transmission module is selected from the group consisting of: wifi transmission module, RFID transmission module, Bluetooth transmission module, or zigbee transmission module.

16. The light quality evaluating device of claim 12, wherein the black body radiation spectrum transforming module transforms the color temperature data obtained from the spectrum data into the luminance spectrum of blackbody radiation by using a Planck's law of $I_{BR}(\lambda, T)=(2hc^2/\lambda^5)/[1/(e^{(hc/\lambda kT)}-$ 1)], wherein the "h" in the Planck's law represents the Planck constant, and the "c", the "k" and the "T" respectively represent the speed of light, the Boltzmann constant and the temperature.

17. The light quality evaluating device of claim 12, wherein the luminance spectrum transforming module transforms the spectrum data into the luminance spectrum of light through multiplying the spectrum data by the luminosity function.

18. The light quality evaluating device of claim 12, wherein by using a spectrum comparing function set, the spectrum comparing module is able to firstly overlap the luminance spectrum of light with the luminance spectrum of blackbody radiation, and next calculates an overlapped area between the luminance spectrum of light and the luminance spectrum of blackbody radiation, so as to eventually obtain the index of spectral resemblance with respect to the blackbody-radiation ($SR_{BR}$) dividing the overlapped area by the area of the luminance spectrum of blackbody radiation.

19. The light quality evaluating device of claim 18, wherein the spectrum comparing function set comprises: (1) $SR_{BR} = [(\int L(\lambda, T)d\lambda)/(\int L_{BR}(\lambda, T)d\lambda)] \times 100\%$; (2a) $L(\lambda, T) = \alpha L_1(\lambda, T)$, if $L_{BR}(\lambda, T) > \alpha L_1(\lambda, T)$; (2b) $L(\lambda, T) = L_{BR}(\lambda, T)$, if $L_{BR}(\lambda, T) \leq \alpha L_1(\lambda, T)$; and (3) $\alpha = (\int LBR(\lambda, T)d\lambda)/(\int L1(\lambda, T)d\lambda)$; wherein $L_{BR}(\lambda, T)$ means the luminance spectrum of blackbody radiation of the light signal, $L(\lambda, T)$ means the overlapped area, $\alpha$ means a luminance constant for equalizing the luminance of the luminance spectrum of light ($L_1(\lambda, T)$) and the luminance spectrum of blackbody radiation ($L_{BR}(\lambda, T)$).

20. The light quality evaluating device of claim 12, wherein the spectrum data of the light signal is a power spectrum.

\* \* \* \* \*